United States Patent
Lopatinsky et al.

(10) Patent No.: US 7,173,353 B2
(45) Date of Patent: Feb. 6, 2007

(54) INTEGRATED BLOWER FOR COOLING DEVICE

(75) Inventors: Edward Lopatinsky, San Diego, CA (US); Lev Fedoseyev, El Cajon, CA (US)

(73) Assignee: Industrial Design Laboratories Inc., San Diego, CA (US)

( * ) Notice: Subject to any disclaimer, the term of this patent is extended or adjusted under 35 U.S.C. 154(b) by 0 days.

(21) Appl. No.: 11/173,728

(22) Filed: Jul. 2, 2005

(65) Prior Publication Data

US 2006/0006745 A1    Jan. 12, 2006

Related U.S. Application Data

(60) Provisional application No. 60/586,128, filed on Jul. 7, 2004.

(51) Int. Cl.
  *H02K 1/27* (2006.01)
  *H02K 5/04* (2006.01)
  *H02K 9/06* (2006.01)
  *H02K 21/16* (2006.01)
  *H02K 37/14* (2006.01)

(52) U.S. Cl. .................... 310/58; 310/89; 310/268; 417/423.1; 417/423.7; 417/423.14; 417/424.1; 417/424.2

(58) Field of Classification Search ............ 417/423.1, 417/423.7, 423.14, 424.1, 424.2; 310/67 R, 310/58, 60 K, 61, 62, 63, 156.32–156.37, 310/268, 89
See application file for complete search history.

(56) References Cited

U.S. PATENT DOCUMENTS

| | | | | |
|---|---|---|---|---|
| 3,398,882 | A * | 8/1968 | Zenkner | 415/53.3 |
| 5,769,069 | A * | 6/1998 | Caffell | 126/634 |
| 5,834,866 | A * | 11/1998 | Fujitani et al. | 310/49 R |
| 6,111,748 | A * | 8/2000 | Bhatia | 361/695 |
| 6,232,696 | B1 * | 5/2001 | Kim et al. | 310/156.37 |
| 2005/0012411 | A1 * | 1/2005 | Hoffman et al. | 310/63 |

FOREIGN PATENT DOCUMENTS

WO    WO 3016718 A1 *    2/2003

* cited by examiner

*Primary Examiner*—Darren Schuberg
*Assistant Examiner*—David W. Scheuermann

(57) ABSTRACT

An integrated blower for cooling device comprises an electric drive with at least one set of a flat stator and a magnetized rotor, a casing with an inlet and an outlet, and radial impeller. The flat stator integrated with the casing thus the flat stator serves as at least a part of the casing, and the magnetized rotor integrated with the radial impeller. The flat stator comprises circumferential arrayed coils with magnetic axes coincide with a plane of the flat stator. The radial impeller comprises blades attached to a backplate and a shroud, and circumferential arrayed magnetic means thus serve as the magnetized rotor. The magnetic means placed and magnetized along the plane of the flat stator thus magnetic axes of the coils and the magnetic means located at one plane substantially.

16 Claims, 14 Drawing Sheets

INTEGRATED BLOWER FOR COOLING DEVICE

CROSS REFERENCE TO RELATED APPLICATIONS

The present application claims the benefit of priority of U.S. Provisional Patent Application No. 60/586,128, filed Jul. 7, 2004 for Edward Lopatinsky at al. the entire content of which is incorporated herein by reference.

FIELD OF THE INVENTION

The present invention relates generally to radial type impeller blowers for cooling of electronic devices. More particularly, the present invention relates to relative thin blowers. The present invention is particularly, but not exclusively, useful for cooling systems for regulating the temperature of electronic components of blade servers.

BACKGROUND OF THE INVENTION

The regulation of the temperature due to heat generated inside the housing of an electronic device is an important consideration during the design of an electronic device. Cooling is important because if left unchecked, heat can cause electronic devices to malfunction during use or lead to premature device failure. As improvements in processor size and speed occur, the amount of heat generated by the larger and faster processors also increases. Additionally, improved processors require larger power supplies and auxiliary components that generate increased amounts of heat and require improved systems for heat removal.

Another factor that aggravates the need for improved heat removal cooling systems is the trend towards making computing devices such as blade server smaller and especially thinner. The trend toward smaller and thinner electronic devices having larger, faster processors renders the traditional heat removal cooling systems inadequate for several reasons.

In order to enhance the cooling capacity of a cooling device, an electrically powered blower is often mounted within or on top of a heatsink of the cooling device. In operation, the blower forces air to pass over fins of the heatsink, thus, cooling the heatsink by enhancing the heat transfer from the fins into the ambient air.

There are known devices of this type, for example, U.S. Pat. No. 6,688,379 "Heat Dissipation Device with High Efficiency". The device described in this U.S. Pat. comprises a radial blower that produces a flow passing by heat exchanging channels of the heatsink. The radial blower comprises conventional hub electric drive spaced at a flowing part inside of a radial impeller thus restrains the air flow and therefore decrease the total amount of air passing through the heatsink. By this reason, the thermal efficiency of this heat dissipation device is insufficient.

Due to modern requirements for cooling devices, especially in respect to a combination of the thermal efficiency and an available space, flat electric drives are often used in radial blowers for cooling of electronic components. There are such devices describe in U.S. Pat. No. 6,664,673 "Cooler for Electronic Devices" and No. 6,700,781 "Heat-Dissipating Module for Removing Heat Generated from Heat-Generating Device". Also, an invention described in U.S. Pat. No. 6,698,505 "Cooler for electronic device" discloses a crossflow blower with a radial impeller. All above mentioned inventions comprises a flat stator plate made as circuit board and a magnetized rotor fixed to a radial impeller of the blower. The flat stator and the magnetized rotor are located in two different parallel planes and separated by an air gap.

However, such arrangement cause a vibration of the flat stator and magnetized rotor due to a rise of oscillation forces in a direction perpendicular to the planes of the flat stator and the magnetized rotor. These forces determine by an interaction between magnetic poles of the stator and rotor. In one's turn the vibration generates an increasing sound level thus contradicts with modern requirements for cooling devices.

On the other hand mentioned vibration cause an energy losses thus decrease the motor efficiency of the electric drive and, correspondingly, a blower efficiency.

It would be desirable to provide integrated blower for cooling device that would overcome these problems associated with increased sound level and decreased blower efficiency.

SUMMARY OF THE INVENTION

Accordingly, it is an object of the present invention to provide an integrated blower for electronic device, which is capable of significantly improving of blower performances such as decreased sound level and increased blower efficiency.

In order to achieve this object, the integrated blower for cooling device comprises an electric drive with at least one set of a flat stator and a magnetized rotor, a casing with an inlet and an outlet, and radial impeller. The flat stator being integrated with the casing thus the flat stator serving as at least a part of the casing, and the magnetized rotor being integrated with the radial impeller. The flat stator comprising circumferential arrayed coils with magnetic axis being coincide with a plane of the flat stator. The radial impeller comprising blades being attached to a backplate and a shroud, and circumferential arrayed magnetic means thus serving as the magnetized rotor. The magnetic means being placed and magnetized along the plane of the flat stator thus magnetic axes of the coils and the magnetic means being located at one plane substantially.

The magnetic means may surrounded by the coils through a radial gap. There is another variant when the coils may surrounded by the magnetic means through a radial gap. The ratio of a diameter of the radial gap in respect to a thickness of the flat stator is at least 25.

There are some variants of mutual magnetization of the flat stator and the magnetic means. First, the magnetic means may magnetized in radial direction and the magnetic axis of the coils are oriented in radial direction too. Second, the magnetic means nay magnetized in tangential direction and the magnetic axes of the coils are oriented in tangential direction too. And, there is another variant, when the magnetic means are magnetized in radial direction and the coils are oriented in tangential direction and the flat stator further comprises circumferential arrayed cores with poles teeth which are oriented in radial direction.

There are some options for magnetic means. The magnetic means may made as at least a part of the backplate of the impeller, may made as at least a part of the shroud of the impeller or may be made as at least a part of the blades of the impeller.

There are two options for blower type. First, axis of the radial impeller is coincided with an axis of the inlet and perpendicular in respect to an axis of the outlet, so gas flows through the inlet in axial direction, the radial impeller and the outlet in a series way thus the blower being a centrifugal type blower. And second, the axis of the radial impeller is perpendicular in respect to axes of the inlet and the outlet, so gas flows through the inlet in radial direction, the radial impeller and the outlet in a series way thus said blower being a crossflow type blower.

The flat stator may further comprises additional circumferential arrayed coils with magnetic axes being coincide with a plane of the flat stator, the additional circumferential arrayed coils are surrounded by the magnetic means through an inner radial gap.

According to a variant of design when the magnetic means made as at least a part of the backplate of the impeller, the electric drive may further comprises additional flat stator and magnetic means, the additional flat stator located at a plane of the shroud and the additional magnetic means made as a part of the shroud.

The foregoing and other objectives, features and advantages of the invention will be more readily understood upon consideration of the following detailed description of the invention, taken in conjunction with the accompanying drawings.

DETAILED DESCRIPTION OF PREFERRED EMBODIMENTS

Figure 1:
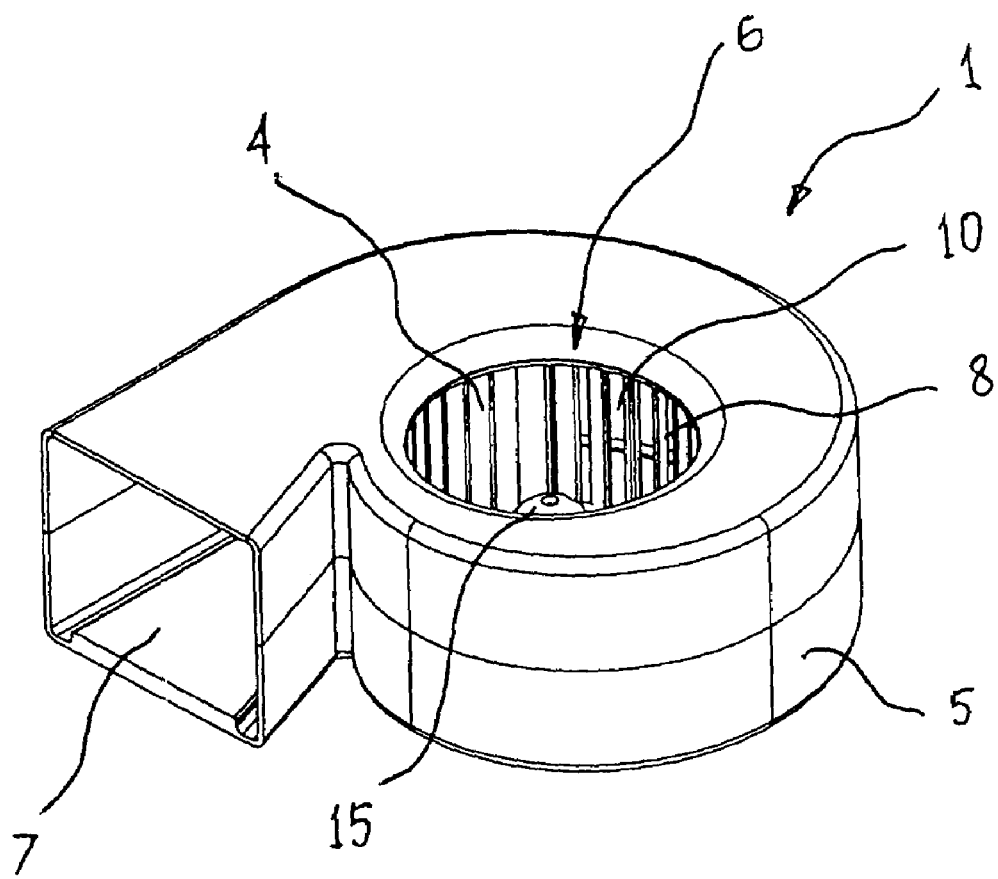
FIG. 1 is a perspective view showing the integrated blower for cooling device.
Figure 1A:
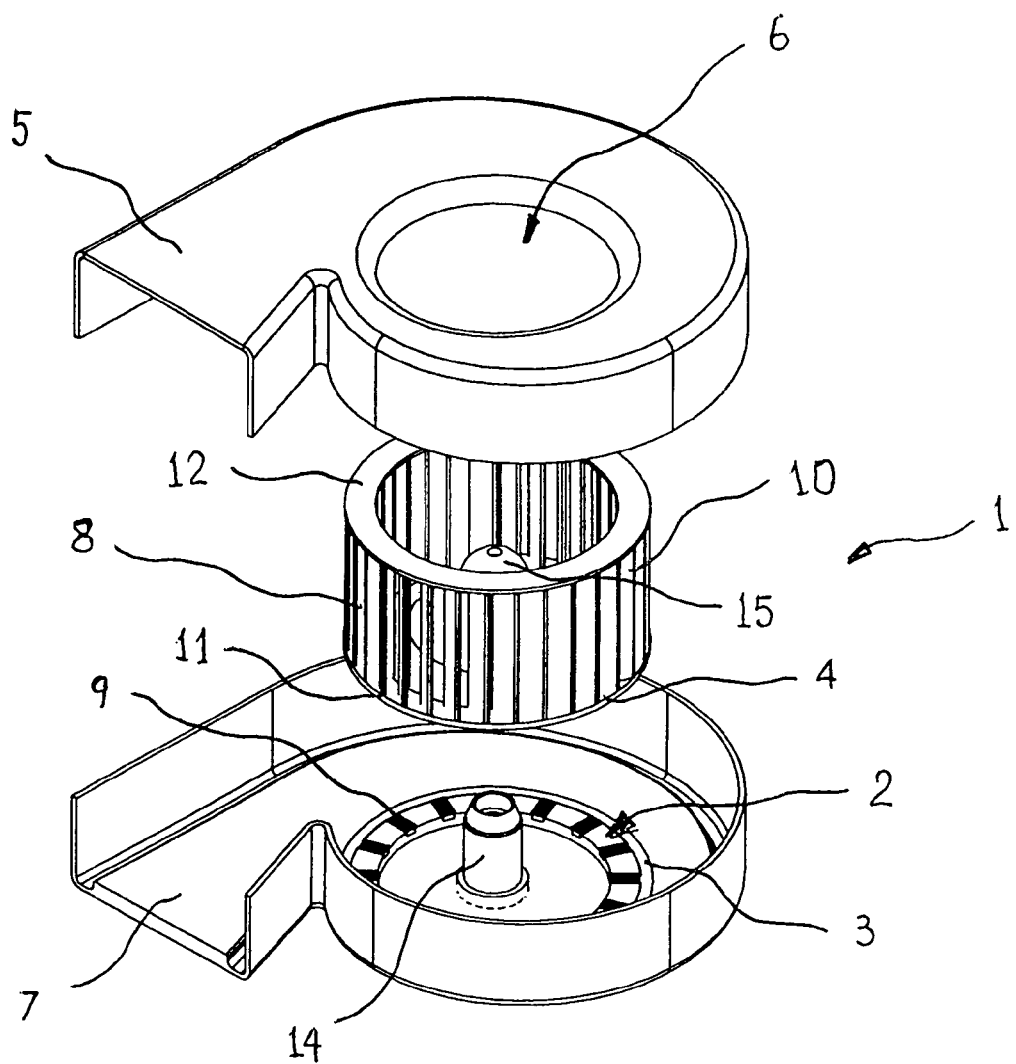
FIG. 1a is an exploded view showing the integrated blower for cooling device.

Preferred embodiment of the present invention will be described in detail below with reference to the accompanying drawings.

FIGS. 1–12 show an embodiment of the present invention.

The integrated blower 1 for cooling device (FIGS. 1, 1a, 2, 3, 10 and 11) comprises an electric drive 2 with at least one set of a flat stator 3 and a magnetized rotor 4, a casing 5 with an inlet 6 and an outlet 7, and radial impeller 8. The flat stator 3 integrated with the casing 5 (FIG. 4) thus the flat stator 3 serving as at least a part of the casing 5, and the magnetized rotor 4 integrated with the radial impeller 8. The flat stator 3 comprises circumferential arrayed coils 9 with magnetic axes being coincide with a plane of the flat stator 3. The radial impeller 8 comprises blades 10 attached to a backplate 11 and a shroud 12, and circumferential arrayed magnetic means 13 thus serving as the magnetized rotor 4. The magnetic means 13 placed and magnetized along the plane of the flat stator 3 thus magnetic axes of the coils 9 and the magnetic means 13 located at one plane substantially. The radial impeller 8 rotates around shaft 14 rigidly fixed to the casing 5 and covered by a shaped part 15 of the backplate 11.

Figure 5:
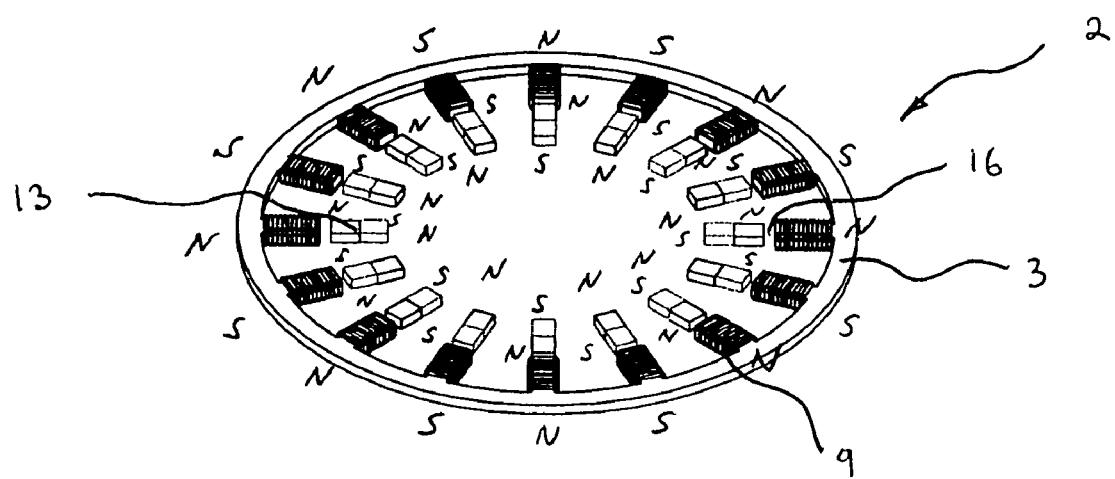
FIG. 5 is a perspective view showing the electric motor of the integrated blower wherein the magnetic means being magnetized in radial direction and surrounded by the coils with the magnetic axes of the coils being oriented in radial direction.
Figure 6:
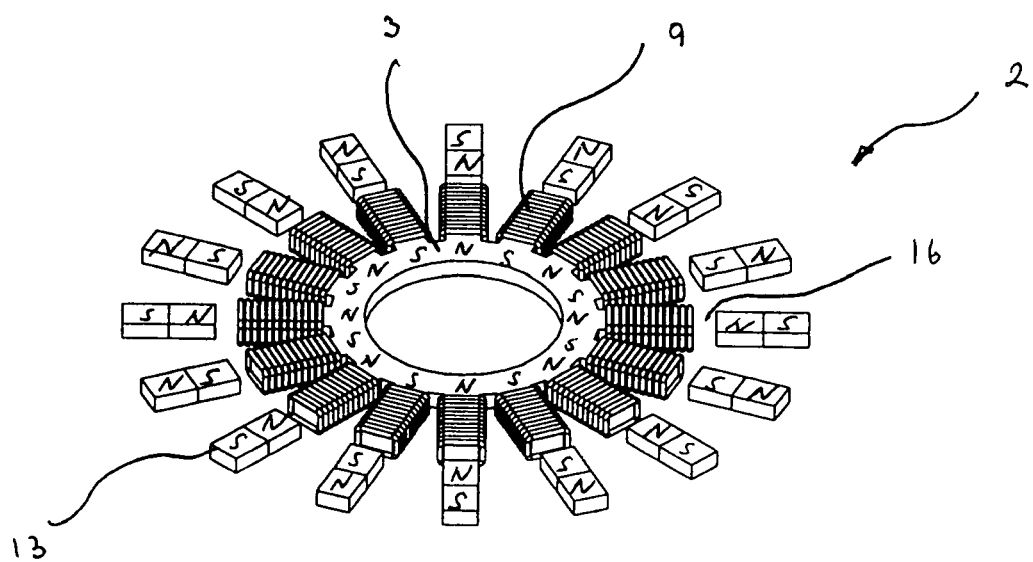
FIG. 6 is a perspective view showing the electric motor of the integrated blower wherein the coils with the magnetic axes of the coils being oriented in radial direction and surrounded by magnetic means being magnetized in radial direction.
Figure 7:
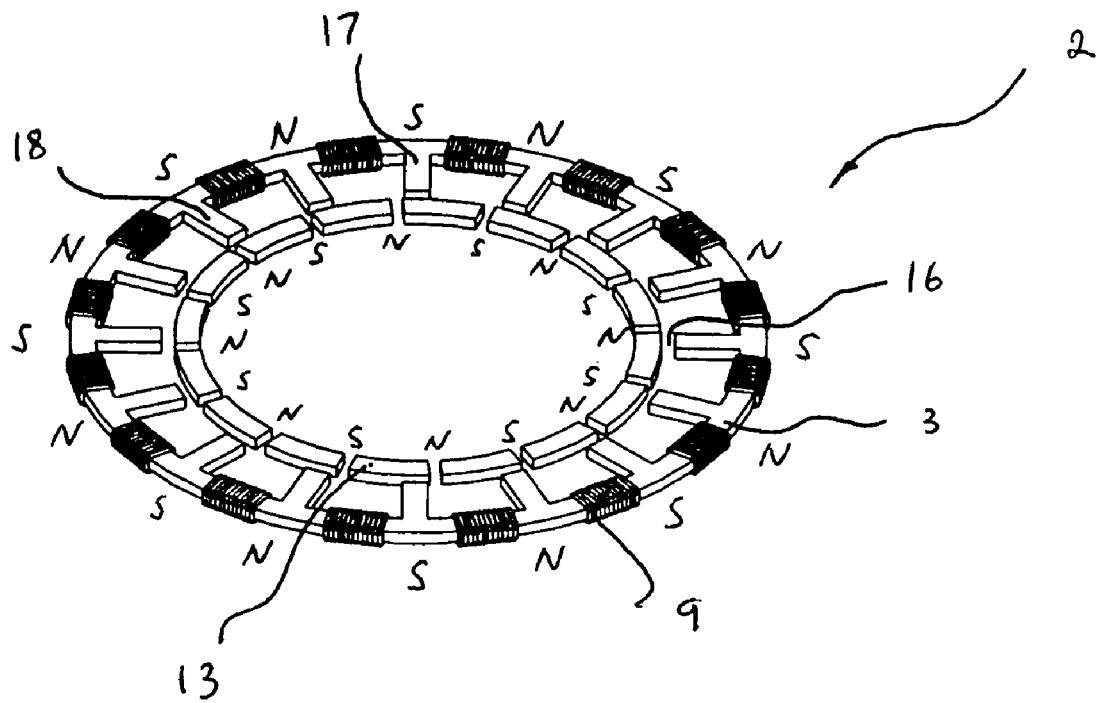
FIG. 7 is a perspective view showing the electric motor of the integrated blower wherein the magnetic means being magnetized in tangential direction and surrounded by the coils with the magnetic axes of the coils being oriented in tangential direction.
Figure 8:
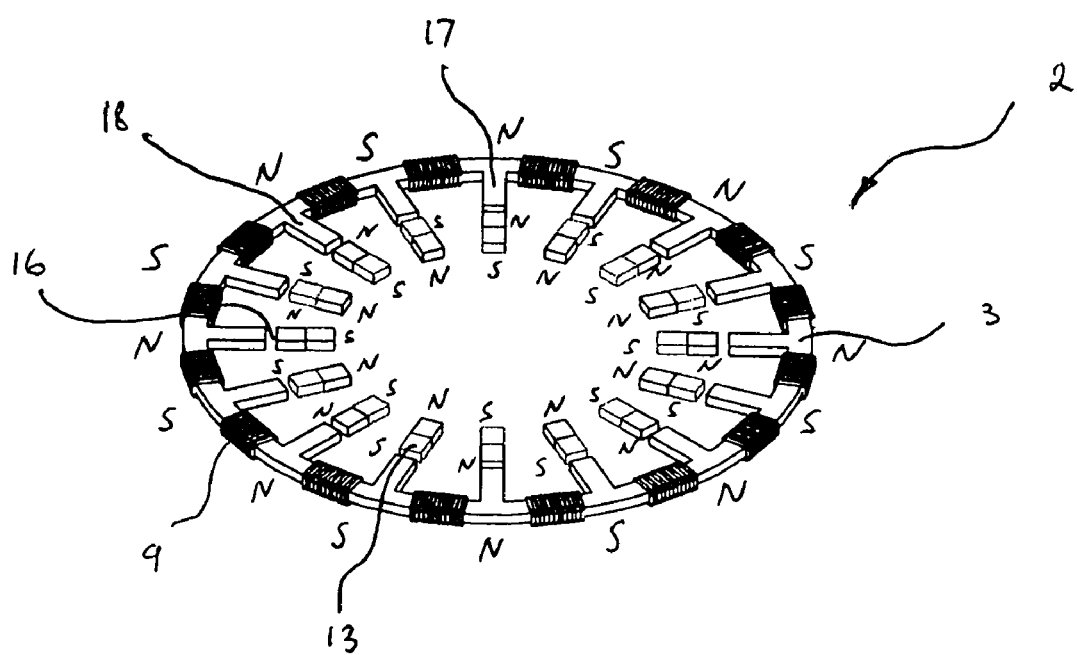
FIG. 8 is a perspective view showing the electric motor of the integrated blower wherein the magnetic means being magnetized in radial direction and surrounded by the coils being oriented in tangential direction and comprising circumferential arrayed cores with poles teeth being oriented in radial direction.

The magnetic means 13 may surround by the coils 9 through a radial gap 16 (FIGS. 5, 7 and 8). There is another variant when the coils 9 may surround by the magnetic means 13 through a radial gap 16 (FIG. 6). The ratio of a diameter of the radial gap in respect to a thickness of the flat stator is at least 25.

There are some variants of mutual magnetization of the flat stator 3 and the magnetic means 13. First, the magnetic means 13 may magnetize in radial direction and the magnetic axes of the coils 9 are oriented in radial direction too (FIG. 5). Second, the magnetic means 13 nay magnetized in tangential direction and the magnetic axes of the coils 9 are oriented in tangential direction too (FIG. 7). And, there is another variant, when the magnetic means 13 are magnetized in radial direction and the coils 9 are oriented in tangential direction and the flat stator 3 further comprises circumferential arrayed cores 17 with poles teeth 18 which are oriented in radial direction (FIG. 8).

There are some options for magnetic means 13. The magnetic means 13 may made as at least a part of the backplate 11 of the impeller 8, could made as at least a part of the shroud 12 of the impeller 8 or may be made as at least a part of the blades 10 of the impeller 8.

Figure 2:
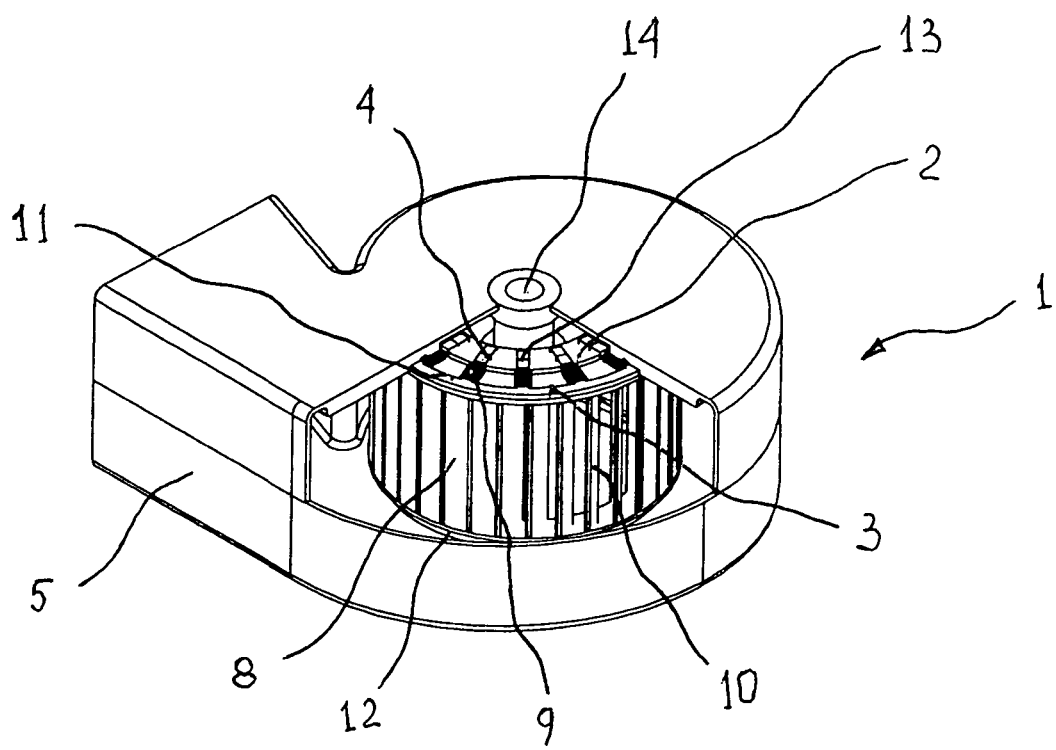
FIG. 2 is a perspective bottom view of the integrated blower for cooling device with removing of a quarter part of the casing showing a part of the electric drive.
Figure 3:
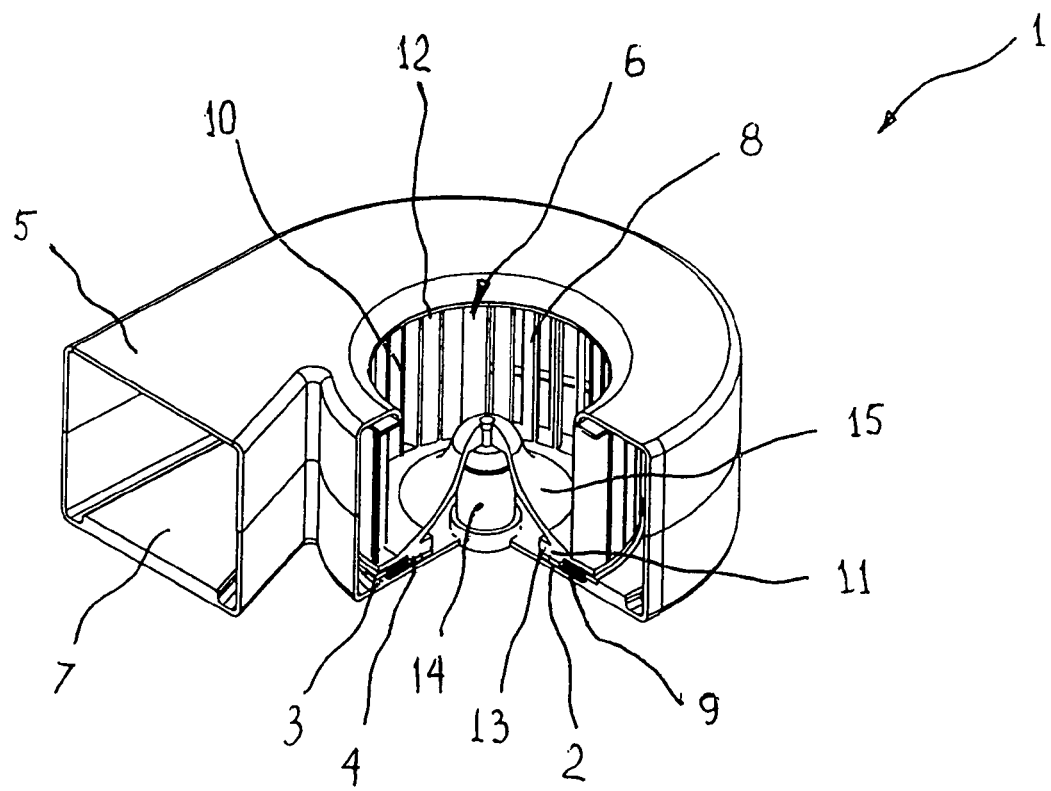
FIG. 3 is a perspective quarter section view of the integrated blower for cooling device.
Figure 4:
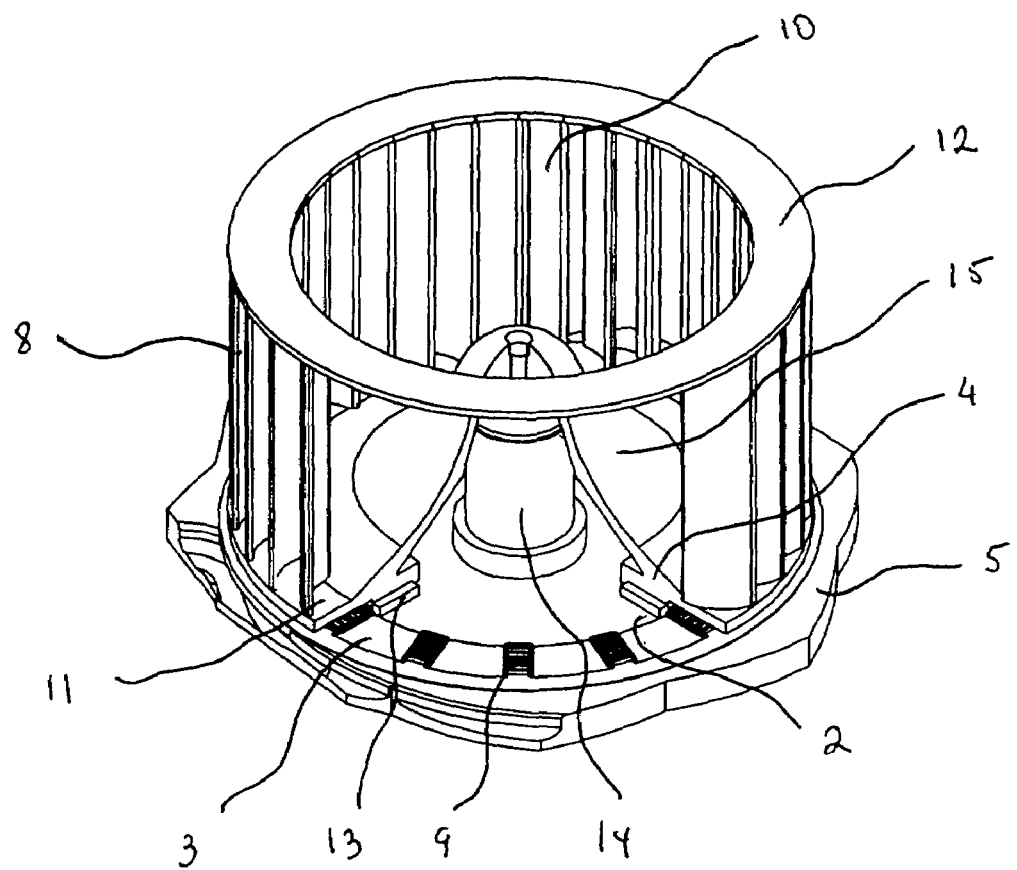
FIG. 4 is a perspective enlarged view of the center part of FIG. 3.
Figure 10:
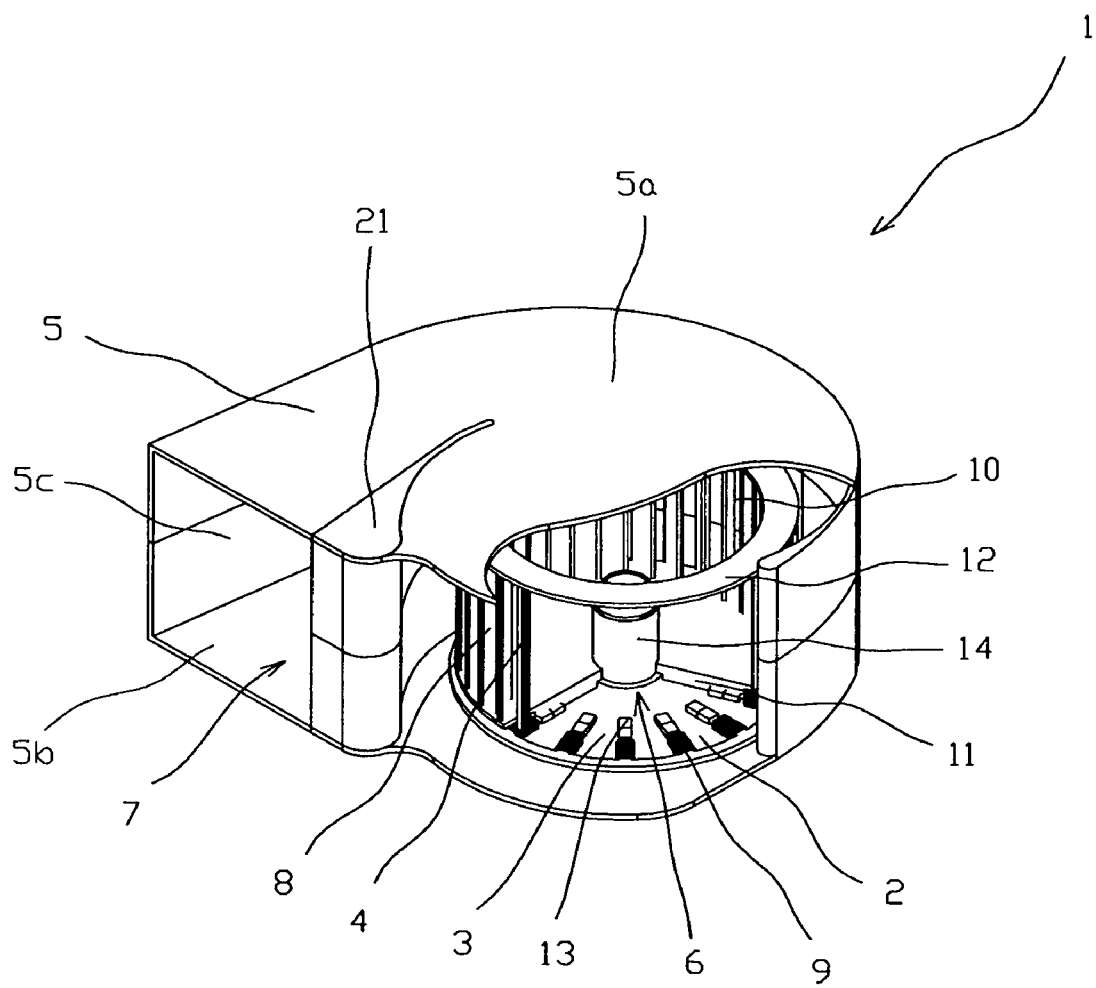
FIG. 10 is a perspective section view showing the integrated blower for cooling device wherein the integrated blower is a crossflow type blower.
Figure 11:
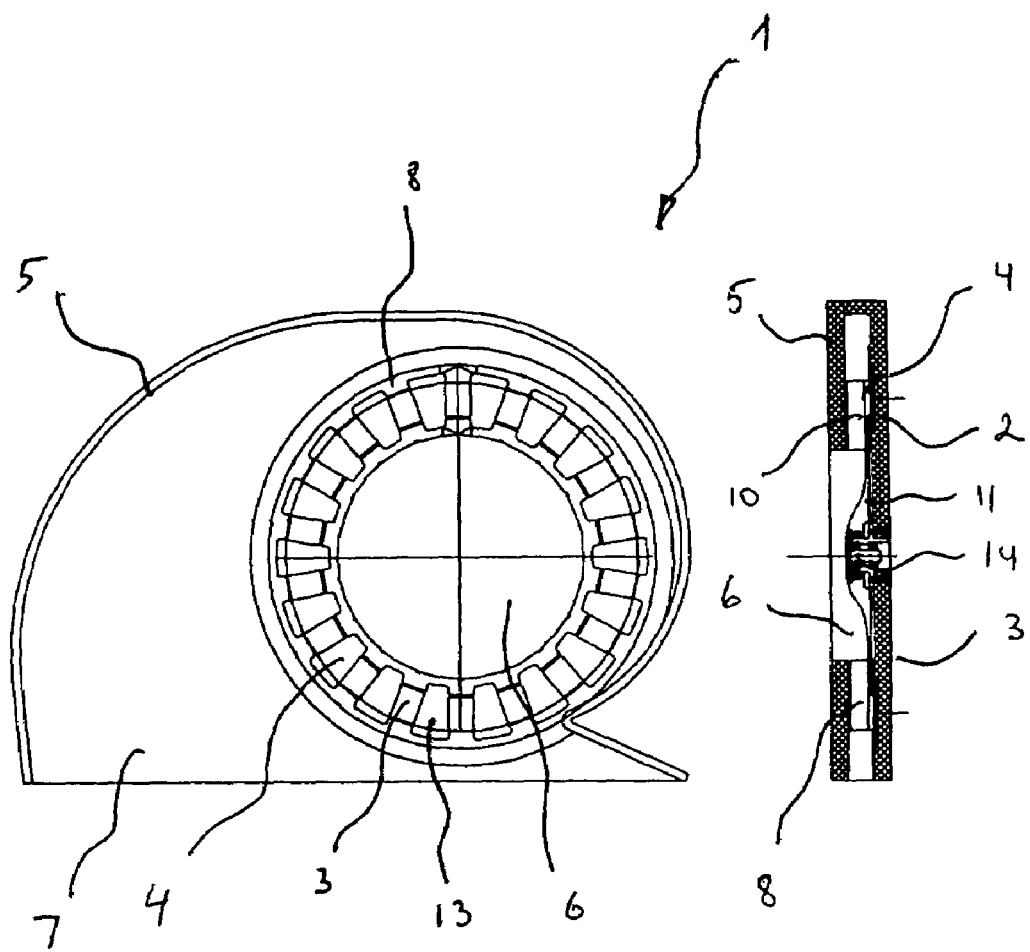
FIG. 11 is a design view of the integrated blower.
Figure 11A:
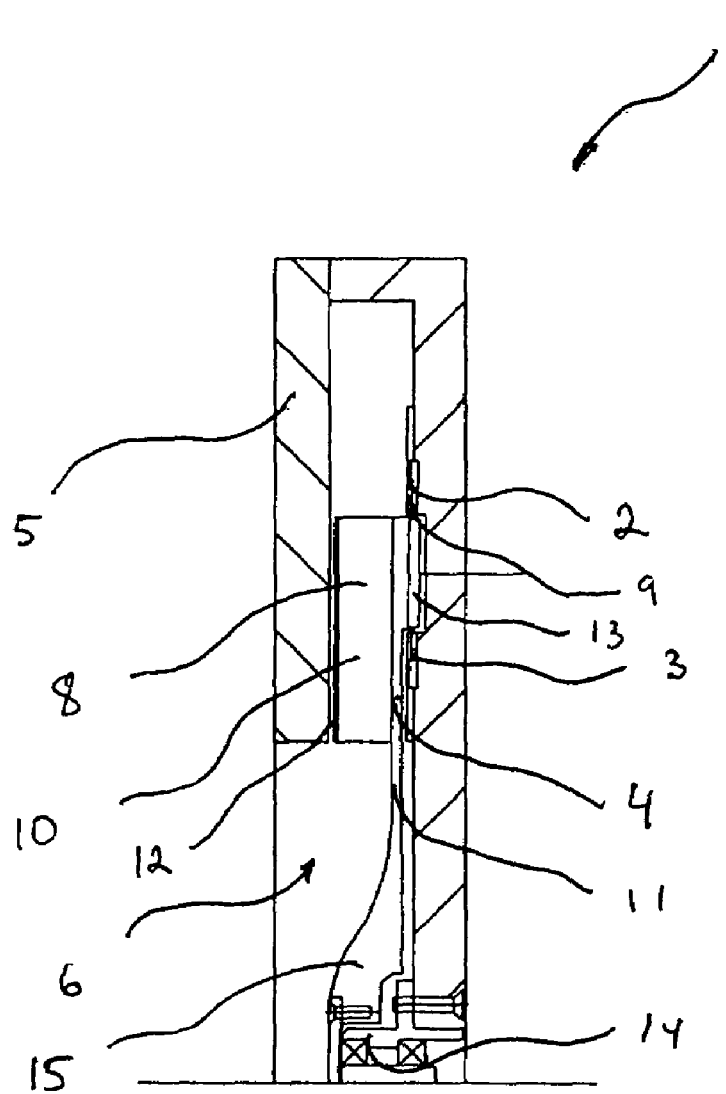
FIG. 11a is a enlarged cross-section view of the integrated blower on FIG. 11.
Figure 12:
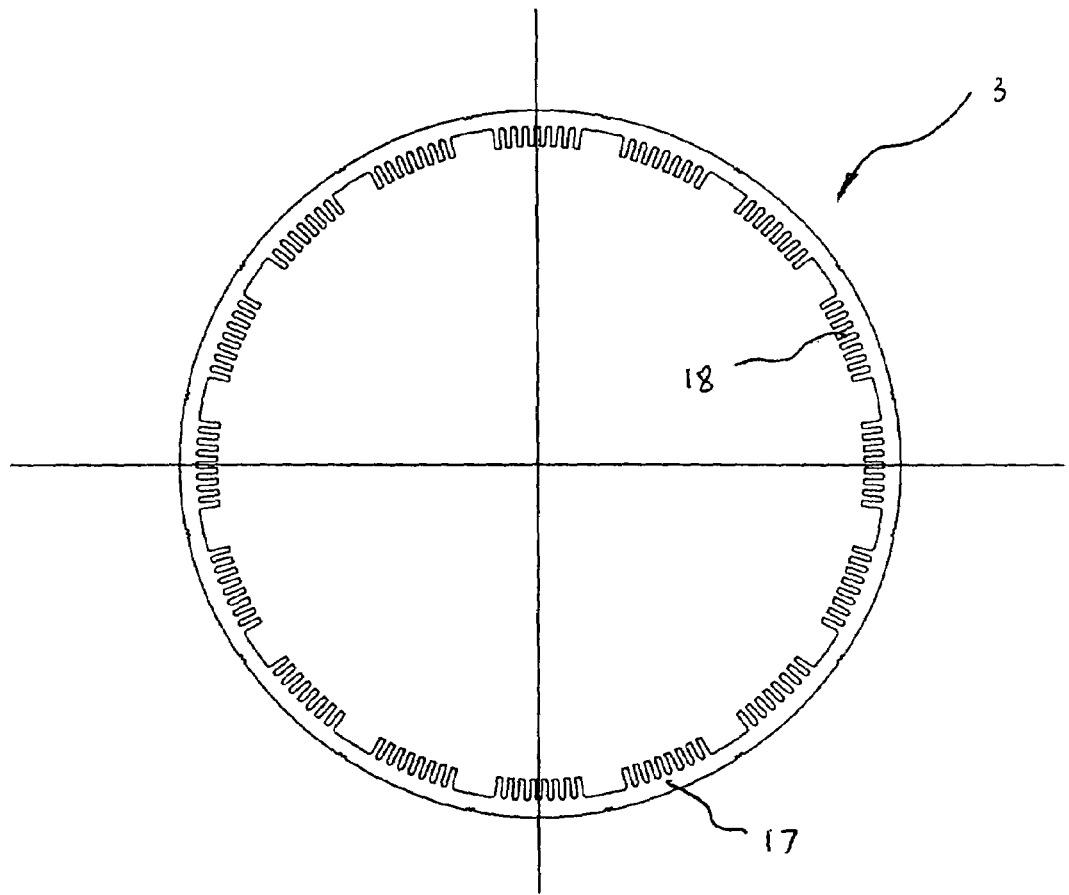
FIG. 12 is a planar view of the flat stator core (coils not shown) of the electric drive of the integrated blower.

There are two options for blower type. First, axis of the radial impeller 8 is coincided with an axis of the inlet 6 and perpendicular in respect to an axis of the outlet 7, so gas flows through the inlet 6 in axial direction, the radial impeller 8 and the outlet 7 in a series way thus the blower 1 being a centrifugal type blower (FIGS. 1–3). And second, the axis of the radial impeller 8 is perpendicular in respect to axes of the inlet 6 and the outlet 7, so gas flows through the inlet 6 in radial direction, the radial impeller 8 and the outlet 7 in a series way thus said blower 1 being a crossflow type blower (FIG. 10).

Figure 9:
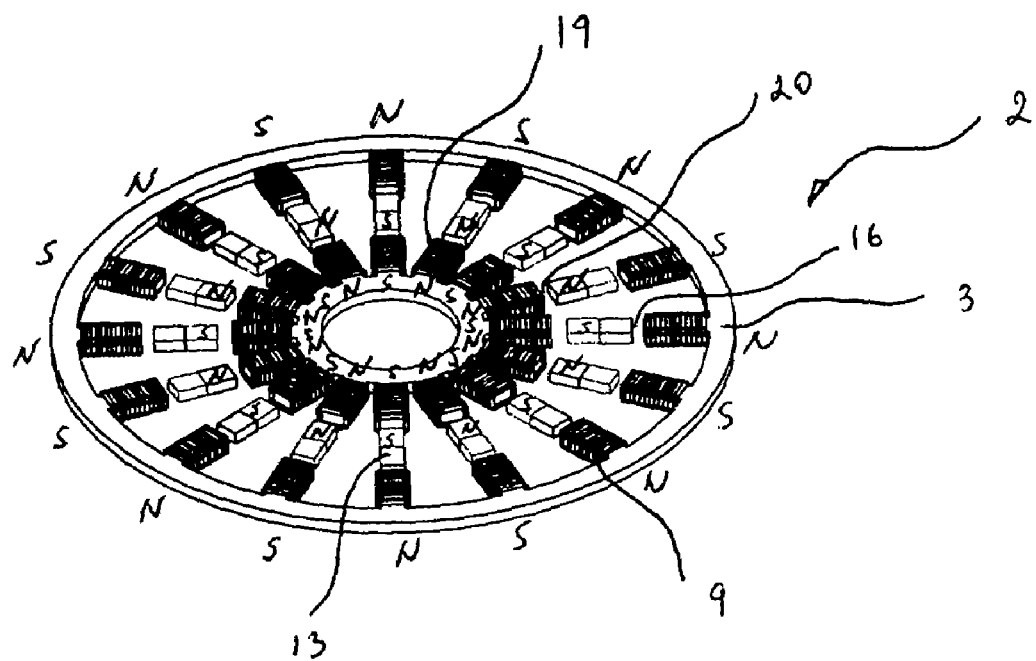
FIG. 9 is a perspective view showing the electric motor of the integrated blower wherein the flat stator comprising additional circumferential arrayed coils with magnetic axis being coincide with the plane of the flat stator, the additional circumferential arrayed coils being surrounded by the magnetic means through an inner radial gap.

The flat stator 3 may further comprises additional circumferential arrayed coils 19 with magnetic axes being coincide with a plane of the flat stator 3, the additional circumferential arrayed coils 19 are surrounded by the magnetic means 13 through an inner radial gap 20 (FIG. 9).

According to a variant of design (not shown on FIGS.) when the magnetic means 13 made as at least a part of the backplate 11 of the impeller 8, the electric drive 2 may further comprises additional flat stator and magnetic means, the additional flat stator located at a plane of the shroud and the additional magnetic means made as a part of the shroud.

Due to the magnetic means 13 being placed and magnetized along the plane of the flat stator 3 thus magnetic axes of the coils 9 and the magnetic means 13 being located at one plane substantially there is no reason for rise of oscillation forces in a direction perpendicular to the planes of the flat stator 3 and the magnetized rotor 4. By this reason there is no vibration of the flat stator 3 and the magnetized rotor 4. Therefore, the present invention characterized by lower sound level and higher motor efficiency.

What is claimed is:

1. An integrated crossflow blower for cooling device comprising located inside of a volute casing a radial drum type impeller and an electric drive, wherein:
   (i) said volute casing comprises of an upper part, a lower part, and a spiral side part spaced between said upper and lower parts;
   (ii) said spiral side part has an inlet and an outlet separated by a profiled tongue spaced at the area of said spiral side part closest to said radial drum type impeller, thus gas flows through said inlet in radial direction, said radial drum type impeller and said outlet in a series way;
   (iii) said electric drive comprises at least one set of a flat stator and a magnetized rotor;
   (iv) said flat stator being integrated with said lower part thus said flat stator serving as at least a part of said lower part, and said magnetized rotor being integrated with said radial drum type impeller;
   (v) said flat stator comprising circumferential arrayed coils with magnetic axes being coincide with a plane of said flat stator;
   (vi) said radial impeller comprising blades being attached to a backplate and a shroud, and circumferential arrayed magnetic means thus serving as said magnetized rotor;
   (vii) said magnetic means being surrounded by said coils through a radial gap and magnetized along said plane of said flat stator thus magnetic axes of said coils and said magnetic means being located at one plane substantially.

2. The integrated crossflow blower as claimed in claim 1, wherein a ratio of a diameter of said radial gap in respect to a thickness of said flat stator being at least 25.

3. The integrated crossflow blower as claimed in claim 1, wherein said magnetic means being magnetized in radial direction and said magnetic axes of said coils being oriented in radial direction as well.

4. The integrated blower as claimed in claim 1, wherein said magnetic means being magnetized in tangential direction and said magnetic axes of said coils being oriented in tangential direction as well.

5. The integrated blower as claimed in claim 1, wherein said magnetic means being magnetized in radial direction and said coils being oriented in tangential direction and further comprising circumferential arrayed cores with poles teeth being oriented in radial direction.

6. The integrated crossflow blower as claimed in claim 1, wherein said magnetic means made as at least a part of said backplate of said impeller.

7. The integrated crossflow blower as claimed in claim 1, wherein said magnetic means made as at least a part of said shroud of said impeller.

8. The integrated crossflow blower as claimed in claim 1, wherein said magnetic means made as at least a part of said blades of said impeller.

9. The integrated blower as claimed in claim 1, wherein said flat stator further comprising additional circumferential arrayed coils with magnetic axis being coincide with said plane of said flat stator, said additional circumferential arrayed coils being surrounded by said magnetic means through an inner radial gap.

10. The integrated blower as claimed in claim 6, wherein said electric drive further comprising additional flat stator and magnetic means, said additional flat stator located at a plane of said shroud and said additional magnetic means made as a part of said shroud.

11. An integrated crossflow blower for cooling device comprising located inside of a volute casing a radial drum type impeller and an electric drive, wherein:
   (i) said volute casing comprises of an upper part, a lower part, and a spiral side part spaced between said upper and lower parts:
   (ii) said spiral side part has an inlet and an outlet separated by a profiled tongue spaced at the area of said spiral part closest to said radial drum type impeller, thus gas flows through said inlet in radial direction, said radial drum type impeller and said outlet in a series way;
   (iii) said electric drive comprises at least one set of a flat stator and a magnetized rotor;
   (iv) said flat stator being integrated with said easing lower part thus said flat stator serving as at least a part of said easing lower part and said magnetized rotor being integrated with said radial drum type impeller;
   (v) said flat stator comprising circumferential arrayed coils with magnetic axes being coincide with a plane of said flat stator;
   (vi) said radial impeller comprising blades being attached to a backplate and a shroud, and circumferential arrayed magnetic means thus serving as said magnetized rotor;
   (vii) said coils being surrounded through a radial gap by said magnetic means magnetized along said plane of said flat stator thus magnetic axes of said coils and said magnetic means being located at one plane substantially.

12. The integrated crossflow blower as claimed in claim 11, wherein a ratio of a diameter of said radial gap in respect to a thickness of said flat stator being at least 25.

13. The integrated crossflow blower as claimed in claim 11, wherein said magnetic means being magnetized in radial direction and said magnetic axes of said coils being oriented in radial direction as well.

14. The integrated crossflow blower as claimed in claim 11, wherein said magnetic means made as at least a part of said backplate of said impeller.

15. The integrated crossflow blower as claimed in claim 11, wherein said magnetic means made as at least a part of said shroud of said impeller.

16. The integrated crossflow blower as claimed in claim 11, wherein said magnetic means made as at least a part of said blades of said impeller.

* * * * *